United States Patent
Ash et al.

(10) Patent No.: US 9,671,136 B2
(45) Date of Patent: Jun. 6, 2017

(54) CLAMP FOR SECURING AND ELECTRICALLY BONDING SOLAR PANELS TO A RAIL SUPPORT

(71) Applicant: Ironridge, Inc., Hayward, CA (US)

(72) Inventors: Jon Ash, Phoenix, AZ (US); Shawn J. Meine, Phoenix, AZ (US)

(73) Assignee: Ironridge, Inc., Hayward, CA (US)

( * ) Notice: Subject to any disclaimer, the term of this patent is extended or adjusted under 35 U.S.C. 154(b) by 0 days.

(21) Appl. No.: 15/081,325

(22) Filed: Mar. 25, 2016

(65) Prior Publication Data

US 2016/0282016 A1 Sep. 29, 2016

Related U.S. Application Data

(60) Provisional application No. 62/137,935, filed on Mar. 25, 2015.

(51) Int. Cl.
| | |
|---|---|
| *F24J 2/52* | (2006.01) |
| *F24J 2/46* | (2006.01) |
| *H02S 30/10* | (2014.01) |
| *F16B 1/00* | (2006.01) |
| *F16B 2/06* | (2006.01) |
| *H02S 20/10* | (2014.01) |

(52) U.S. Cl.
CPC ........ *F24J 2/46* (2013.01); *F16B 1/00* (2013.01); *F16B 2/065* (2013.01); *H02S 20/10* (2014.12); *H02S 30/10* (2014.12); *F16B 2001/0064* (2013.01); *F24J 2002/4663* (2013.01); *F24J 2002/4669* (2013.01)

(58) Field of Classification Search
USPC ............... 248/237, 316.1, 316.2; 52/173.3
See application file for complete search history.

(56) References Cited

U.S. PATENT DOCUMENTS

| | | | |
|---|---|---|---|
| 9,142,700 B2* | 9/2015 | Meine | H01L 31/18 |
| 9,160,273 B2* | 10/2015 | Schuit | F16B 2/065 |
| 9,175,881 B2* | 11/2015 | Schrock | F16B 9/023 |
| 2010/0276558 A1* | 11/2010 | Faust | F24J 2/5205 |
| | | | 248/222.14 |
| 2014/0042286 A1* | 2/2014 | Jaffari | F16B 2/065 |
| | | | 248/316.4 |

(Continued)

FOREIGN PATENT DOCUMENTS

EP   2636970   9/2013

*Primary Examiner* — Steven Marsh
(74) *Attorney, Agent, or Firm* — Law Office of Lance C. Venable, PLLC

(57) ABSTRACT

In various representative aspects, a clamp assembly that secures a solar panel module to a rail support structure that utilizes a generally c-shaped clamp in combination with a t-bolt and a binding bolt such that the t-bolt and binding bolt fit through a pair of apertures in the c-shaped clamp. This enables the foot of the t-bolt to be inserted into a guide on the top of the rail support structure so that the clamp can subsequently secure the solar panel module to the rail support structure by rotating the binding bolt, which in turn locks the t-bolt within the guide and the top of the clamp is then tightened with continuous rotation of the binding bolt, which also enables raised portions on the foot of the t-bolt and top of the clamp to create an electrical bonding path between the solar panel module and the rail support structure.

21 Claims, 11 Drawing Sheets

(56) References Cited

U.S. PATENT DOCUMENTS

| | | | |
|---|---|---|---|
| 2014/0353435 A1* | 12/2014 | Liu | F24J 2/5258 248/74.1 |
| 2015/0102194 A1* | 4/2015 | Liu | F24J 2/5258 248/316.1 |
| 2016/0039351 A1* | 2/2016 | Patel | B60R 9/058 224/309 |

* cited by examiner

CLAMP FOR SECURING AND ELECTRICALLY BONDING SOLAR PANELS TO A RAIL SUPPORT

BACKGROUND OF INVENTION

Field of the Invention

The present invention relates generally to providing an apparatus for securing a solar panel module to a rail support structure. More specifically, the invention relates to the use of a t-bolt with a generally c-shaped end clamp that mounts the end clamp to the top of a solar panel module on one end and the t-bolt in a guide of the rail support structure on another end, while also mechanically fastening and electrically bonding the solar panel module to the rail support structure.

Description of the Related Art

Any discussion of the prior art in the specification should in no way be considered as an admission that the prior art is widely known or forms part of common general knowledge in the field.

The installation of solar panel arrays on residential roofs can be arduous and time-consuming. Depending on the array design, the components required to install the array can make the installation process even more difficult. Many of the assembly components are difficult to install because they require special tools or are positioned in difficult places to reach on their support elements.

Solar panel arrays can be installed using different rail support structures. One type of rail support structure utilizes a series of rails that are arranged in rows across a roof and fixed to flashings that are secured to the roof. The solar panels are then arranged in an array and secured to the top of these rails.

There are various techniques to secure the solar panels to the rails. One type of rail support structure includes slots or guides along the top of the rail for receiving mounting hardware used to secure the solar panels to the rails. One type of mounting hardware is an end clamp that mounts to the outer perimeter of the solar panel module by using a t-bolt to secure the end clamp to the rail structure. The solar panel module is secured on one end by the top of the end clamp and on the other end by securing the head of a t-bolt within the rail guide.

A limitation of these types of end clamps that use t-bolts as the means to secure the end clamp to the solar panel module is that the t-bolt is often difficult to tighten using standard nut and t-bolt combinations. This is so because the head of the t-bolt, once inserted into the guide at the top of the rail does not remain fixed within the guide making the use of a standard nut to tighten the clamp often clumsy and difficult. It is desirable to provide an end clamp that not only secures the solar panels to the rails outer perimeter of the array, but is also easy to install and capable of electrically bonding the solar panel to the rail guides. The terms "clamp" and "end clamp" are used interchangeably as it applies to the present invention.

Another desirable feature is to be able to provide an electrical bonding path between the solar panel modules and the rail guides without having to use unsightly wiring to connect all of the components. One way this can be accomplished is by using the end clamp and the t-bolt to provide the conducting path by creating an electrical connection to the solar panel modules and rail guides respectively.

Existing clamps are either unsatisfying in providing a way to secure solar panel modules to rails with guides or slots located on the top of the rails. For example, U.S. Patent Application No. 2014/0042286 teaches a solar panel assembly attachment apparatus that utilizes a c-shaped end clamp with a pair of apertures on its top and bottom for receiving a t-bolt. The enlarged end of the t-bolt is inserted into a guide of the rail support structure and the elongated threaded portion of the t-bolt is inserted into the apertures of the clamp. The clamp is then tightened by using a standard nut on the top of the threaded portion of the t-bolt. This clamp also includes serrated raised portions on the top of the clamp for penetrating and providing an electrical bonding path from the solar panel module to the rail support.

The present invention overcomes the limitation of using a standard nut to tighten the clamp by incorporating a binding bolt that frictionally engages the threaded elongated portion of the t-bolt that includes a small nylon patch fixed on the outer surface of the elongated portion and enables the t-bolt to rotate in conjunction with the rotation of the binding bolt as it tightens the clamp to the solar panel module. By using this configuration, the head of the t-bolt, which also includes raised portions along its perimeter, can immediately engage and penetrate the inner surface of the guide to complete the electrical bonding path from the solar panel module to the rail support. The binding bolt can also include a serrated flange nut for easier tightening of the bolt. This makes the installation of the present invention easier and less complex than the '286 invention.

The present invention overcomes the limitations in the prior art and provides a solution that is both easy to install and use.

SUMMARY OF THE INVENTION

The invention is summarized below only for purposes of introducing embodiments of the invention. The ultimate scope of the invention is to be limited only to the claims that follow the specification.

It is an object of this invention to provide a clamp for securing a solar panel module to a supporting rail structure.

It is a further object of this invention that the clamp is a generally c-shaped body.

It is a further object of this invention that the clamp includes a pair of axially aligned apertures that can receive an elongated bolt through them.

It is a further object of this invention that the top side of the clamp has at least one raised portion for electrically bonding to the top surface of the solar panel module by having the raised portion penetrate a surface layer of the solar panel module.

It is a further object of this invention that the elongated bolt is a t-bolt.

It is a further object of this invention that the t-bolt includes an enlarged end on one end of a threaded bolt portion.

It is a further object of this invention that the enlarged end of the t-bolt include at least one raised portion capable of penetrating a surface layer of the guide.

It is a further object of this invention that the t-bolt be tightened by using a binding bolt.

It is a further object of this invention that the binding bolt is tubular and includes a serrated nut on one side of it.

It is a further object of this invention that a nylon patch is fixed on the elongated threaded portion of the t-bolt to create friction between the elongated portion of the t-bolt and the inner surface of the binding bolt.

It is a further object of this invention to provide a method of assembling a solar panel to a rail support structure utilizing the components described below.

A person with ordinary skill in the relevant art would know that any shape or size of the elements described below may be adopted as long as the end clamp can be used to secure solar panel modules to the rail support structures and a binding bolt is used to tighten the t-bolt to the guide of the rail support structure. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

DETAILED DESCRIPTION OF THE INVENTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 1:
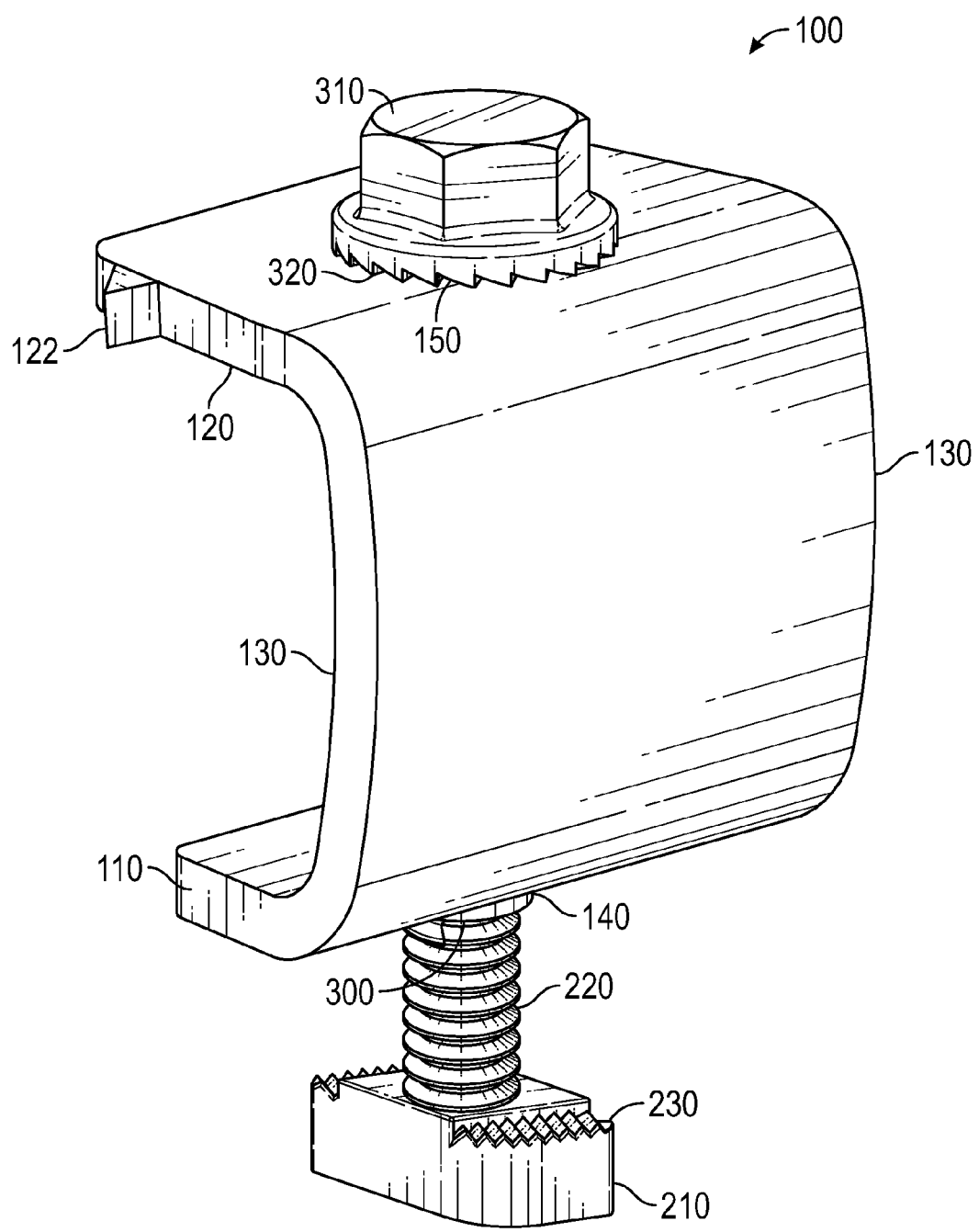
FIG. 1 illustrates a rear perspective view of an exemplary clamp assembly.
Figure 8:
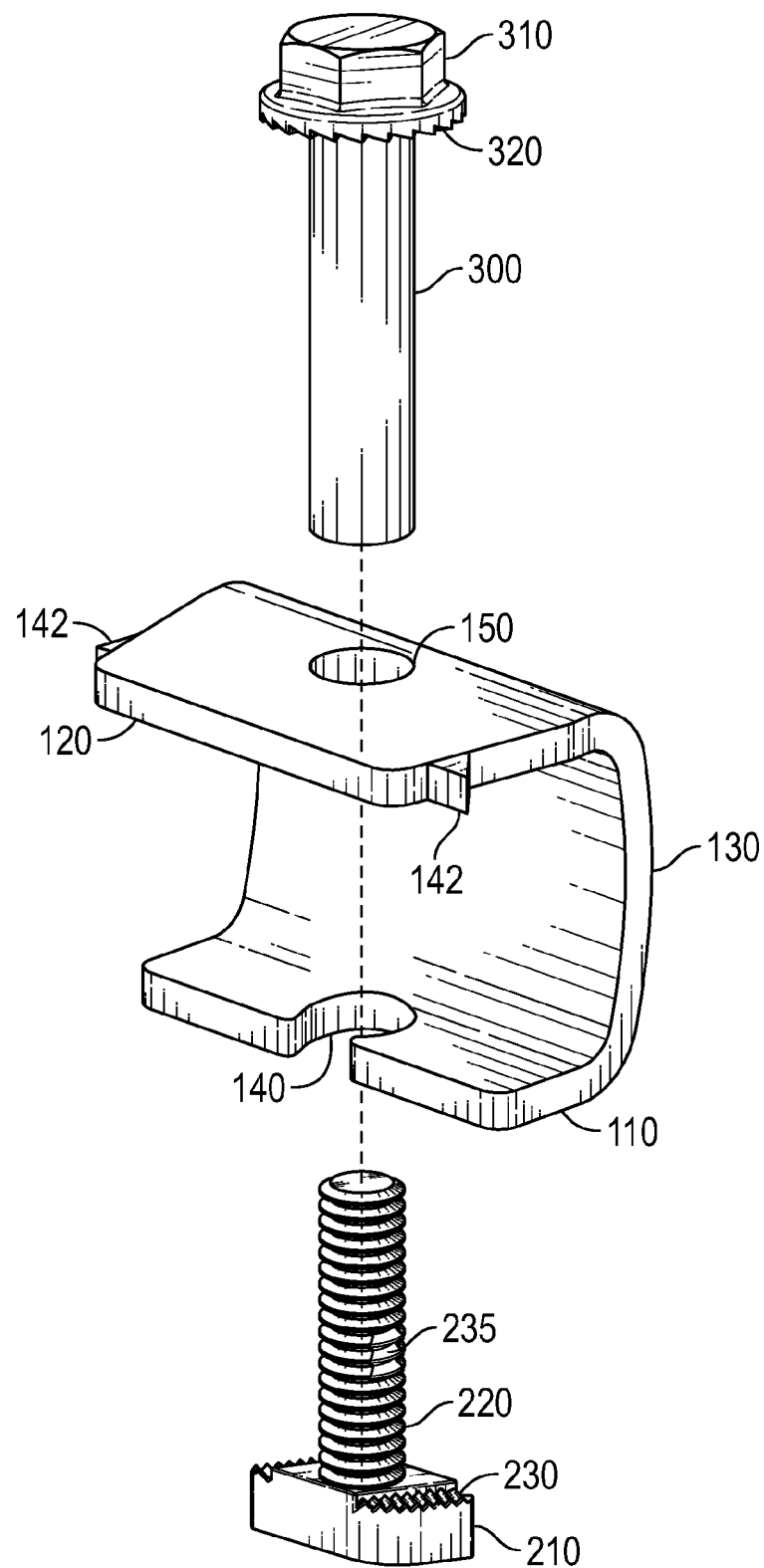
FIG. 8 illustrates a front exploded view of the clamp assembly
Figure 9:
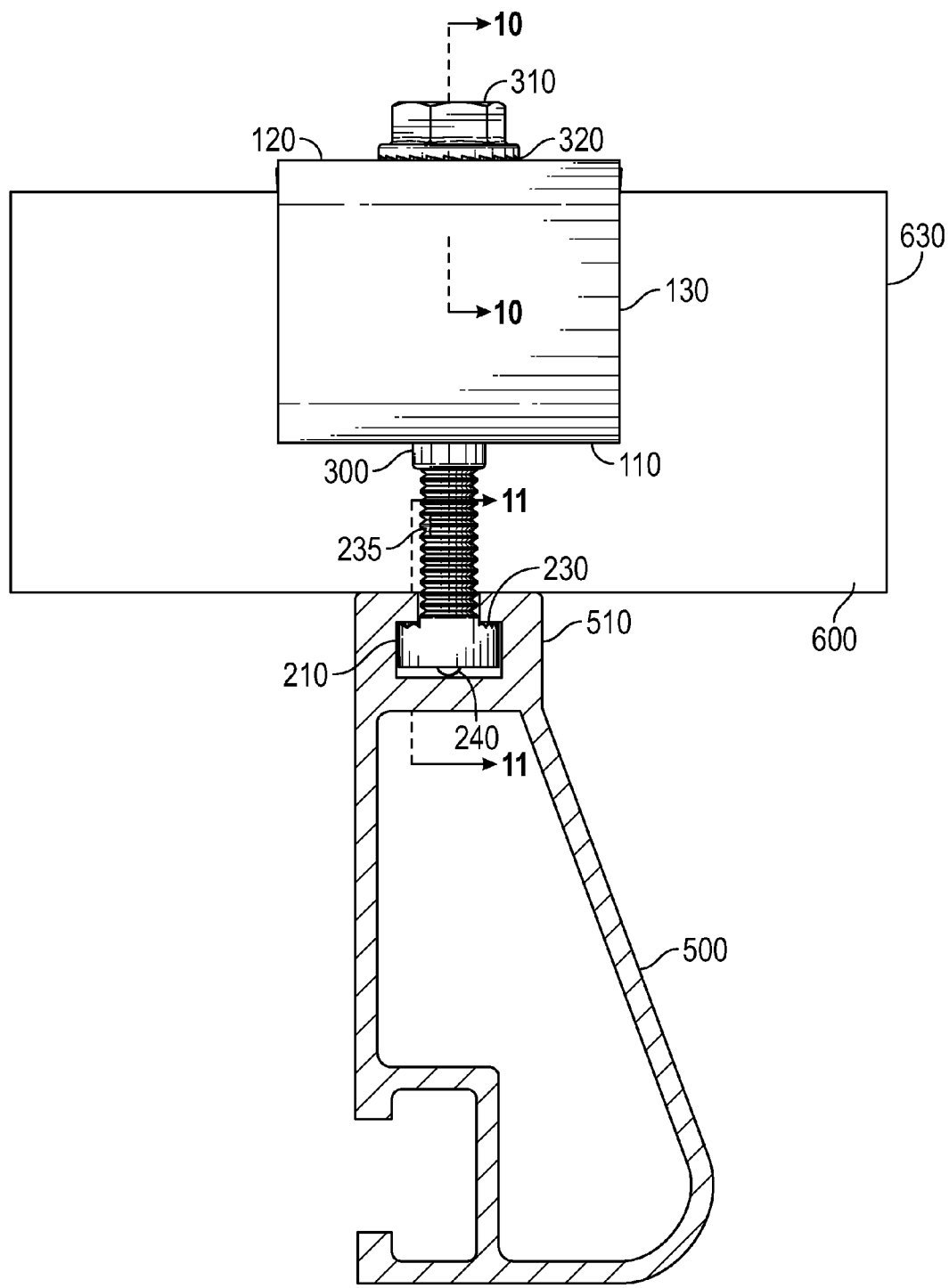
FIG. 9 illustrates a rear view of the clamp assembly after it has been inserted into the guide of a rail support structure.
Figure 12:
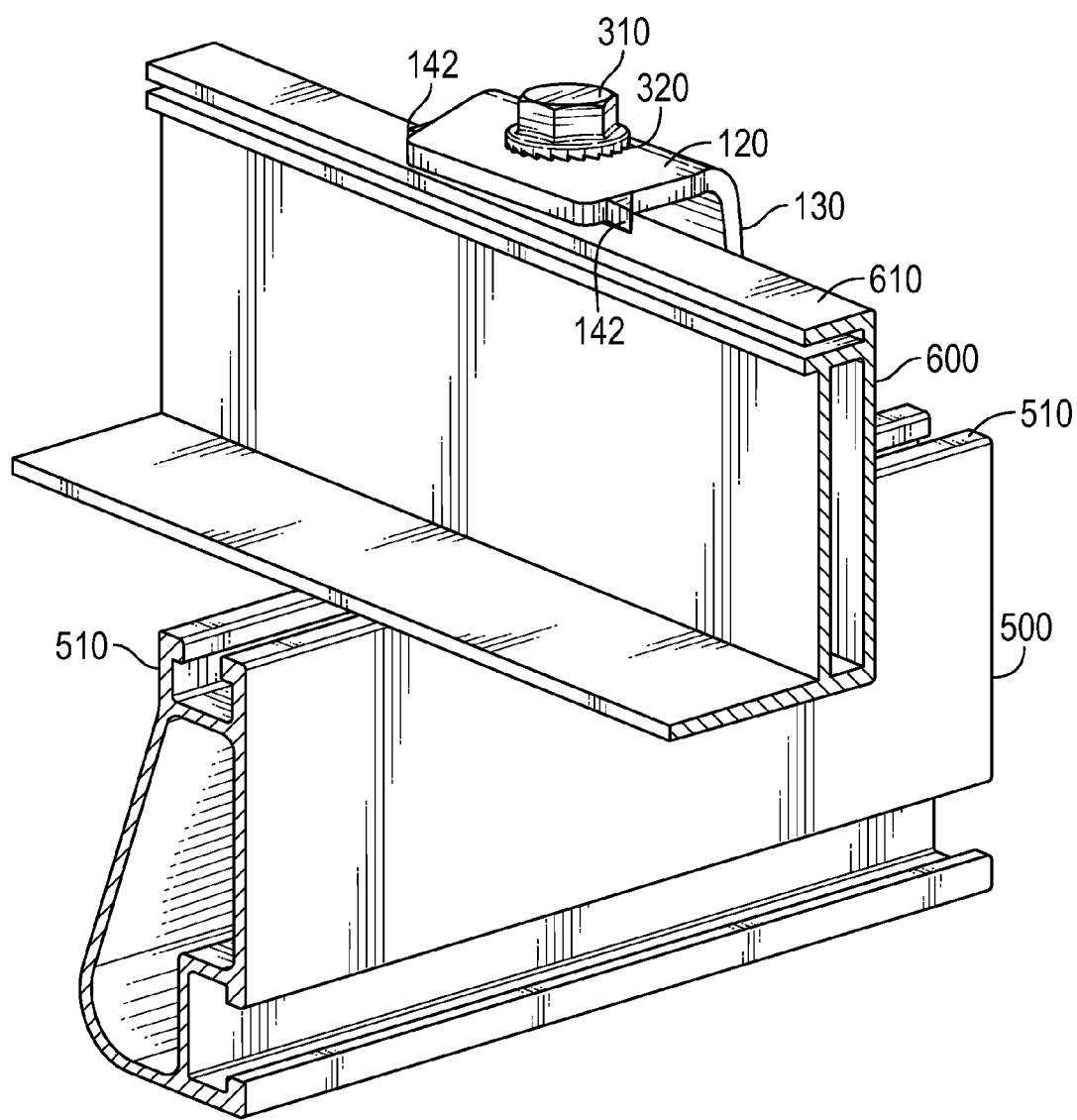
FIG. 12 is a front perspective view of the installed clamp assembly.
Figure 13:
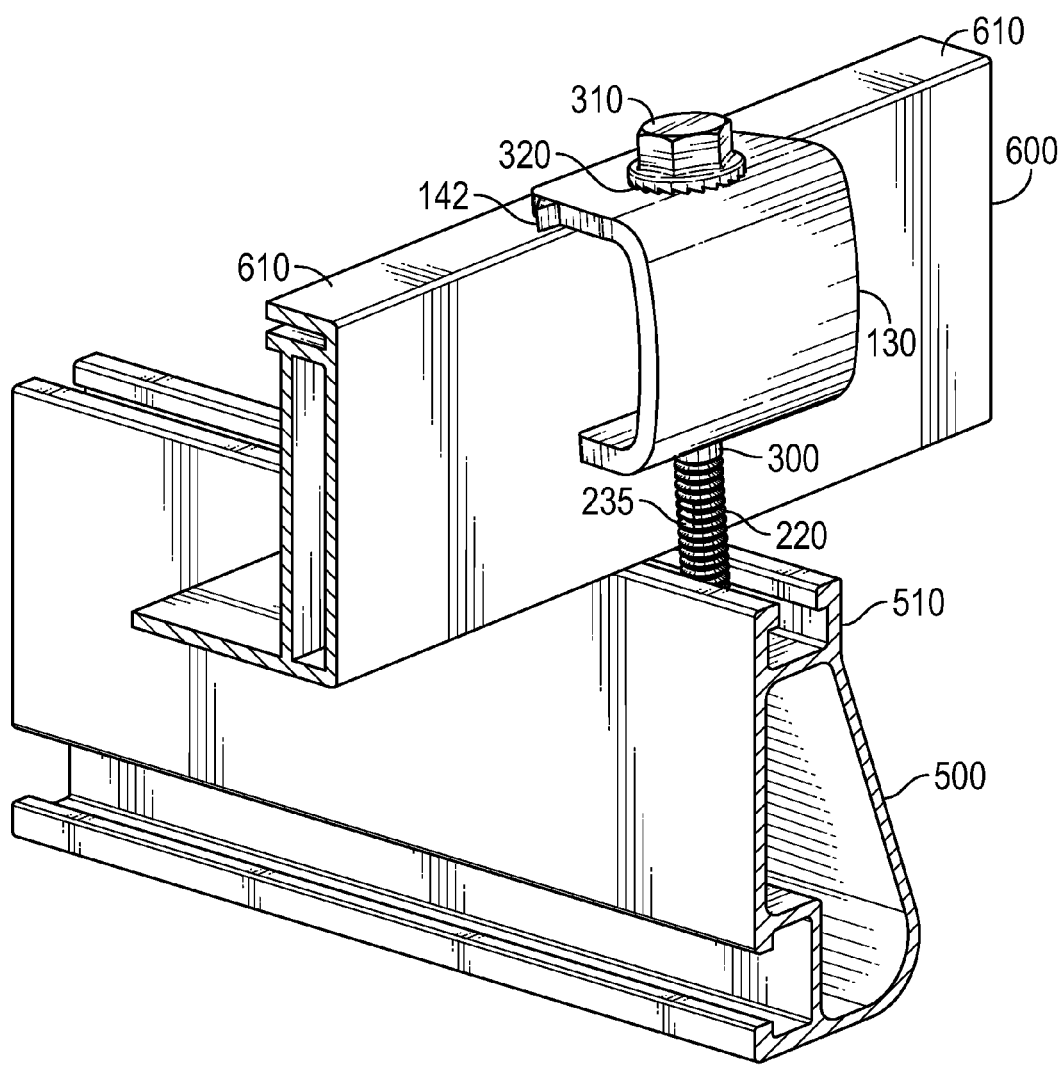
FIG. 13 is a rear perspective view of the installed clamp assembly.

FIG. 1 shows a rear perspective view of a clamp 100 for use in fastening a solar panel module to a rail support structure 500 (as shown in FIG. 9). The exemplary embodiment of the clamp 100 is generally a c-shaped or u-shaped structure that includes a top jaw 120, a rear end 130, and a bottom jaw 110. The top and bottom jaws 120 and 110 are typically in the form of flanges, but can be of any suitable shape that form a mouth-like opening with respect to the rear end 130. The clamp 100 is typically made from an electrically conducting material. The top jaw 120 also includes at least one raised portion 122. In this embodiment, a pair of raised portions 122 are shown and can typically be positioned anywhere on the top jaw 120. The raised portions 122 protrude downward and are typically blunt enough to penetrate a surface layer of the solar panel module 610 as shown in FIGS. 9, 12, and 13. A pair of apertures 140 and 150 are positioned in the bottom and top jaws 110 and 120 respectively. The length of the top jaw 120 is typically greater than that of the bottom jaw 110. This additional length allows the top jaw grab connect to a solar panel module as will be shown below. The apertures 140 and 150 are axially aligned so that they are capable of receiving a bolt, or in the case of the present invention, the elongated threaded portion 220 of a t-bolt 200 and a binding bolt 300. The apertures are shown in more detail in FIG. 8.

Figure 2:
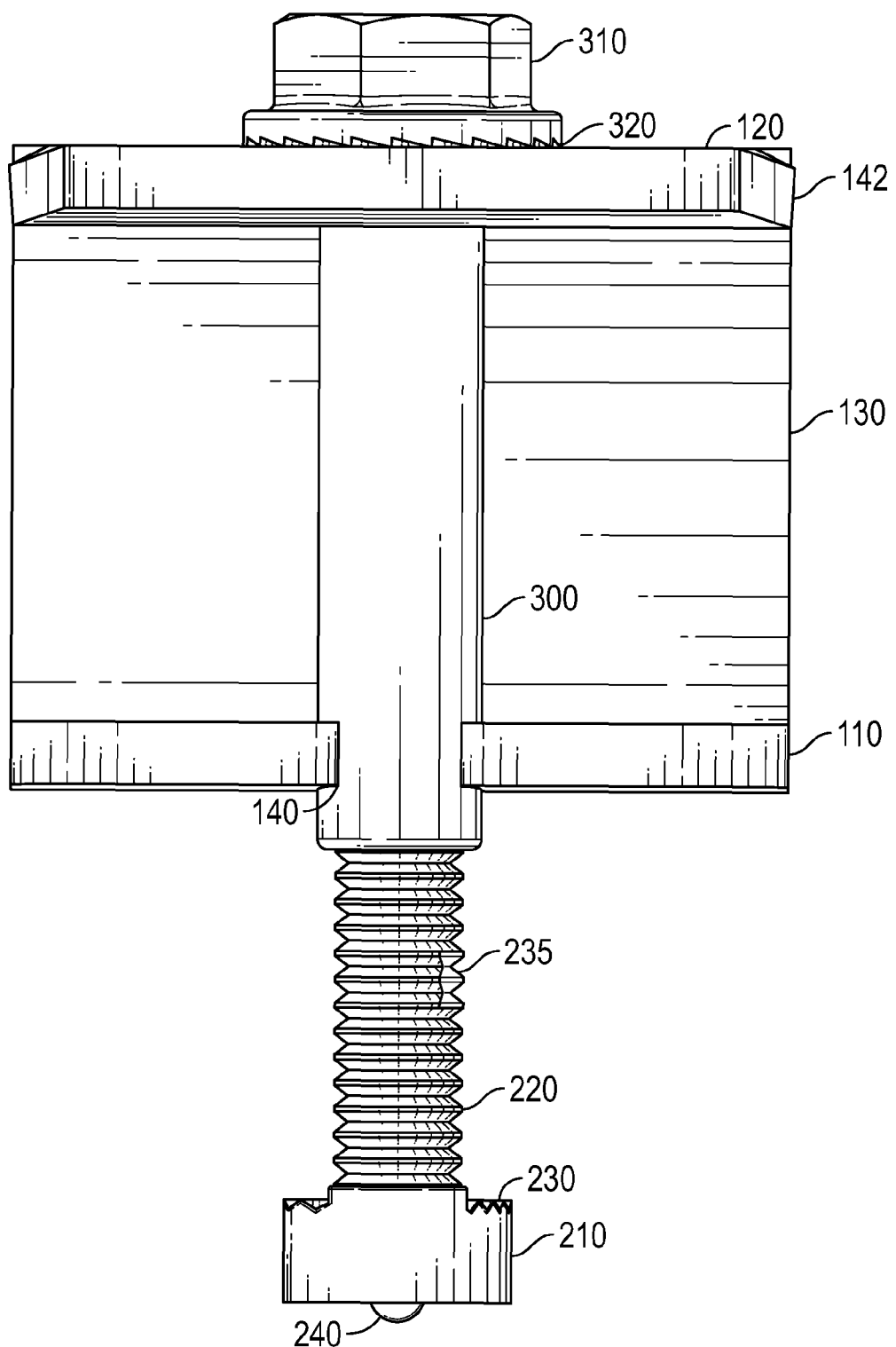
FIG. 2 illustrates a front view of the clamp assembly.
Figure 3:
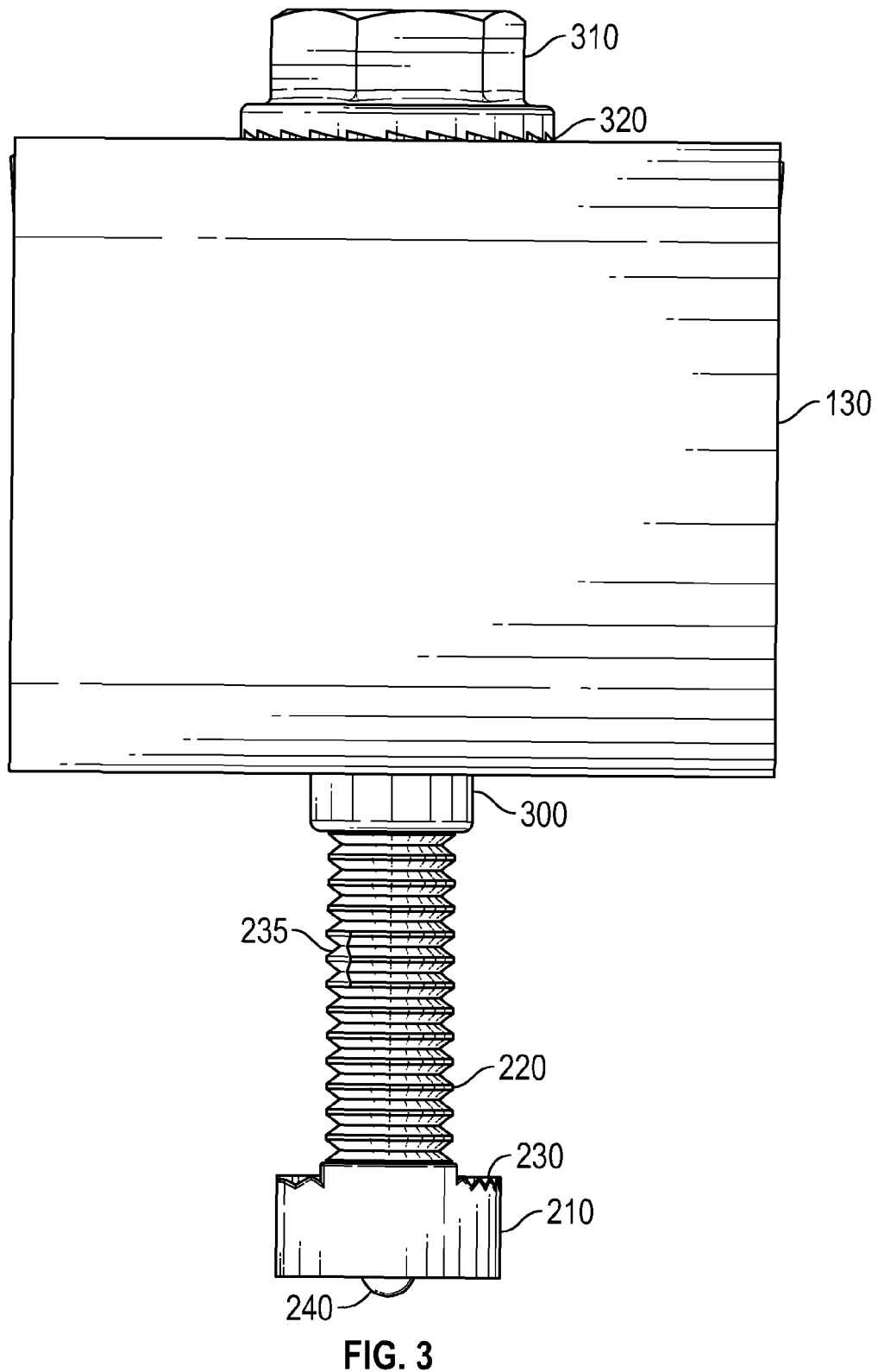
FIG. 3 illustrates a rear view of the clamp assembly.
Figure 4:
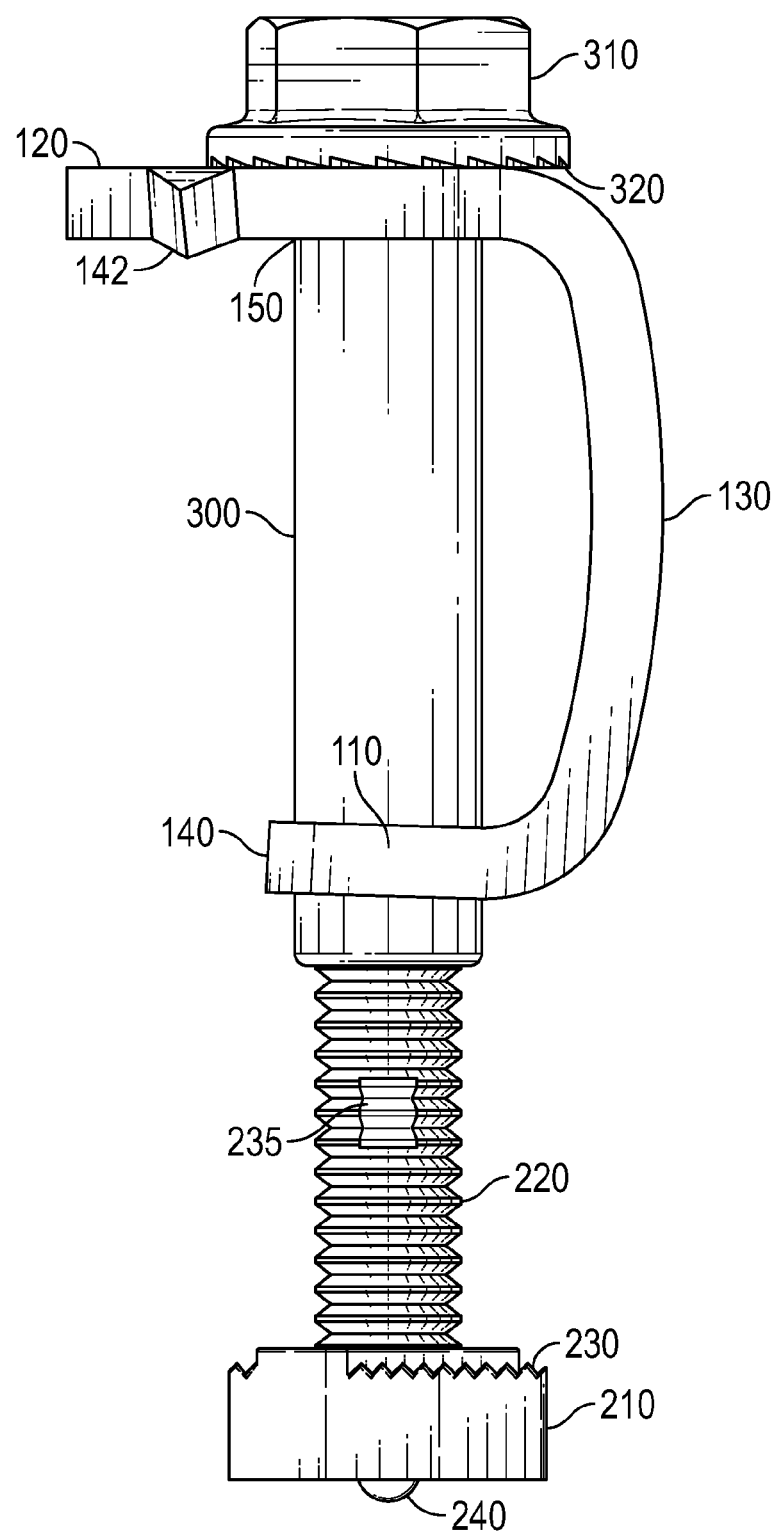
FIG. 4 illustrates a side view of the clamp assembly.

FIGS. 2 through 6 illustrate additional views of the clamp assembly 100 respectively. As shown in FIGS. 2, 4, and 8, the elongated portion 220 of the t-bolt 200 is typically inserted through the bottom aperture 140 and then through the top aperture 150.

Figure 7:
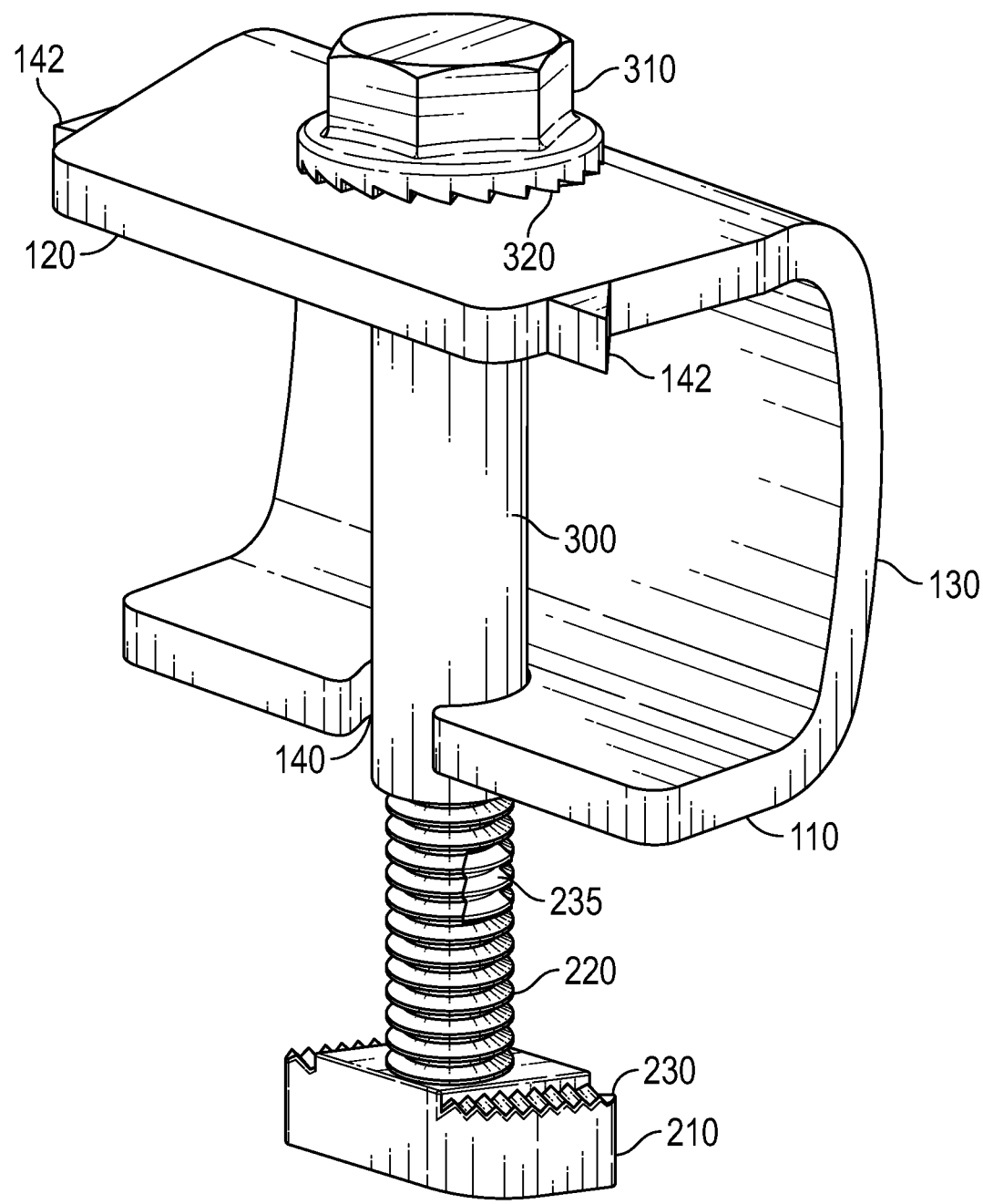
FIG. 7 illustrates a front perspective view of the clamp assembly.
Figure 10:
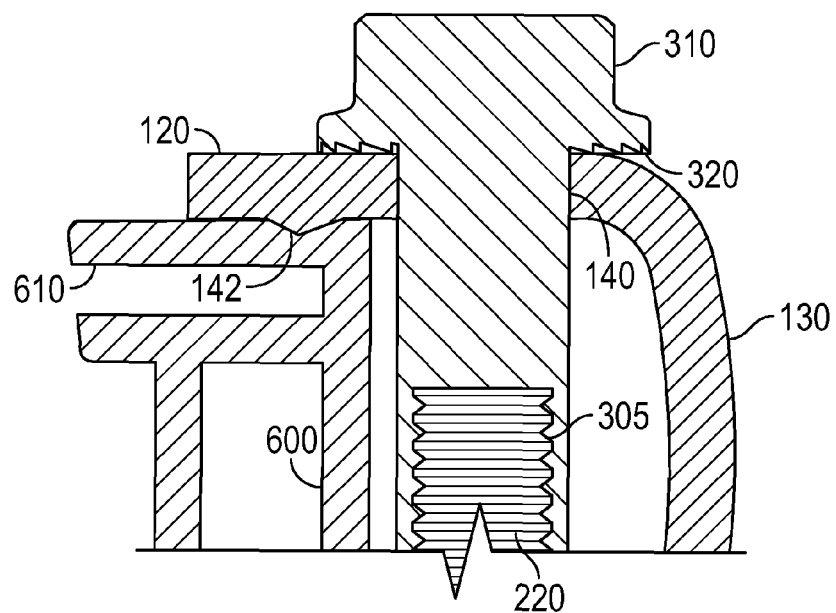
FIG. 10 illustrates a cross-sectional view (9-9) from FIG. 9 of the top jaw of the clamp showing its raised portion penetrating the surface layer of the top of the solar panel module and serrations on a nut penetrating the surface layer of the top jaw portions of the clamp respectively.
Figure 11:
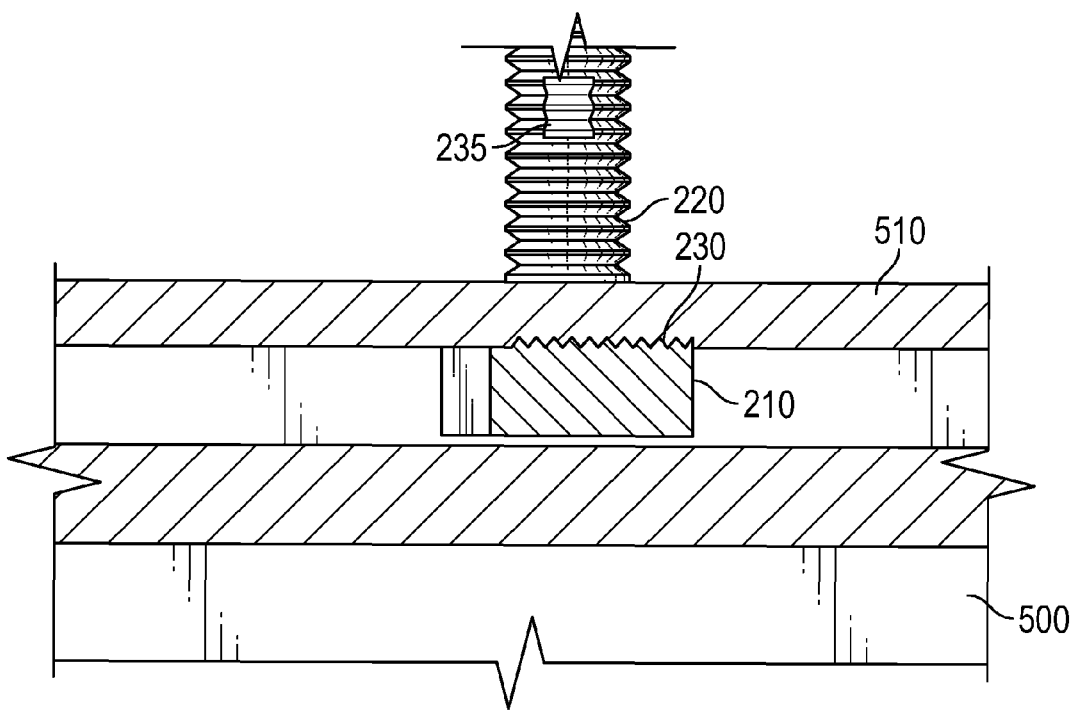
FIG. 11 illustrates a cross sectional view (10-10) from FIG. 9 of raised portions of a t-bolt shown penetrating the surface layer of the guide.

FIGS. 10 and 11 show a cross-sectional view of the binding bolt 300 and the t-bolt 200. The t-bolt 200 includes an elongated portion 220 that is connected to an enlarged end 210. The enlarged end 210 further comprises at least one raised portion 230 on the outer surface of the foot enlarged end. The binding bolt 300 includes an elongated threaded tube 305 and a flange nut 310 that also comprises a serrated bottom flange 320. The serrations can also be included on the bottom of the nut 310 itself without the flange 320. The binding bolt 300 is typically coupled to the t-bolt 200 by rotating the threaded tube 305 around the elongated portion 220 of the t-bolt 200. A small nylon patch 235 can also be introduced between the tube 305 and the elongated portion 220. The nylon patch 235 can either be fixed to the elongated portion 220 or the inner surface of the threaded tube 305, but is normally affixed to the threaded elongated portion 220 as shown. The nylon patch creates a frictional coupling between the elongated portion 220 and the threaded tube 305 to enable the t-bolt 200 and the binding bolt 300 to turn simultaneously when securing the solar panel module 600 to the rail support 500 as will be discussed below. The binding bolt 300 is inserted through the top aperture 150 over the elongated portion 220 of the t-bolt 200 and as discussed below, the binding bolt 300 will be used to secure the clamp to a solar panel module. The t-bolt 200 also includes a ball detent 240 in the joint between the elongated portion 220 and the enlarged end 210, which enables the t-bolt 200 to keep the clamp 100 vertical and in place when it is inserted into the guide 510 of the rail structure 500 (as shown in FIG. 9). FIG. 7 illustrates a front perspective view showing all of the elements of the clamp assembly 100 as described above.

Figure 5:
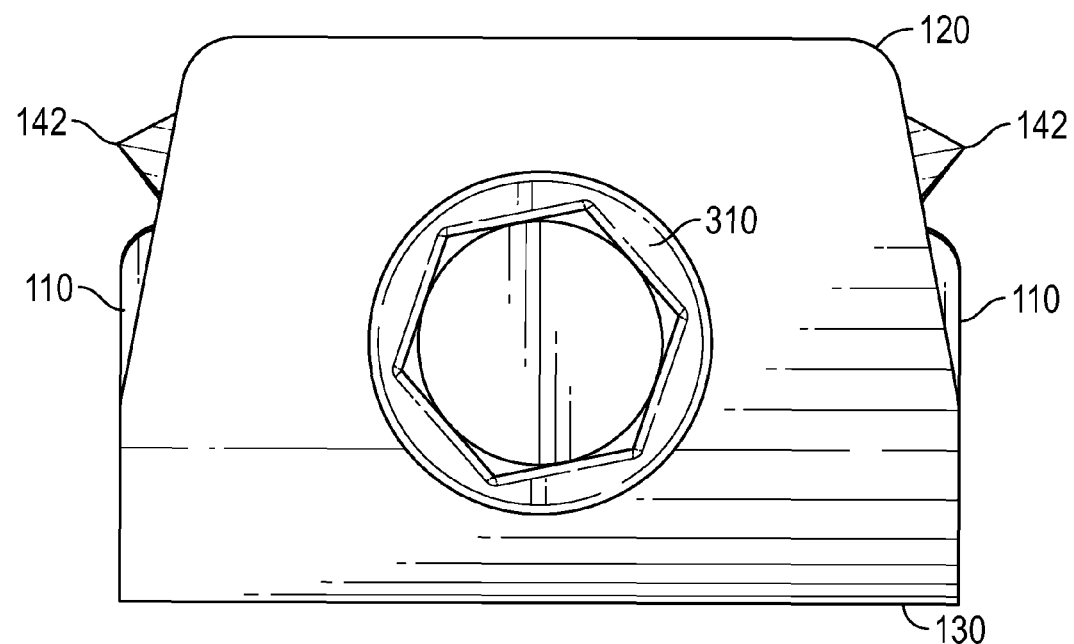
FIG. 5 illustrates a top view of the clamp assembly.
Figure 6:
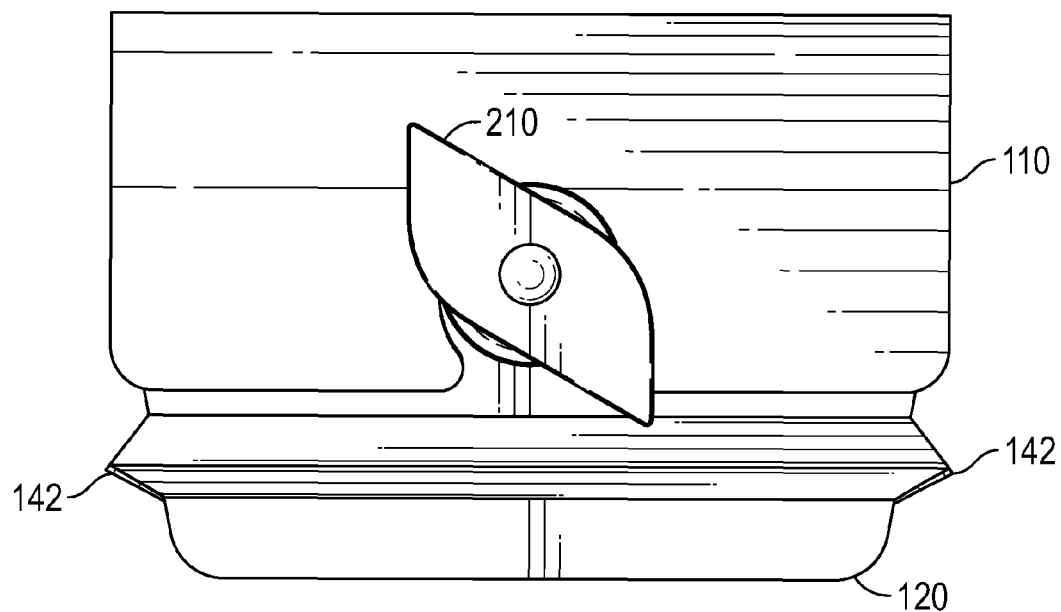
FIG. 6 illustrates a bottom view of the clamp assembly.

FIGS. 5 and 6 show top and bottom views of the clamp assembly 100 respectively. As shown in FIG. 6, the enlarged end 210 of the t-bolt 200 can be of any suitable shape as long as it is capable of being fitting within a guide 510 of the rail structure 500 so that when the enlarged end 210 is rotated clockwise, the outer edges 215 engage the inner walls of the guide 510.

FIG. 8 shows an exploded view of the clamp assembly 100 with all of the elements as described above. The apertures 140 and 150 are shown more prominently and are axially aligned between the top jaw 120 and the bottom jaw 110.

The purpose of the clamp assembly 100 is to secure a solar panel module to a rail support structure. FIGS. 12 and 13 illustrate front and rear perspective views of the clamp assembly 100 when it is fully installed. FIGS. 9-11 show more details of the assembly. FIG. 9 shows a rear view of the entire assembly fully installed. A typical configuration comprises a rail support structure 500 and a solar panel module 600 that includes a bottom flange 620 on its lower end and a top flange 610 opposite the bottom flange 620 with a rear wall 630 in between. The rail support 500 is normally secured to a flashing structure that has been previously installed on a roof (not shown) and includes a guide 510 on or near the top of the support 500 for receiving the head 210 of the t-bolt 200. The process of securing the solar panel module 600 to the rail support 500 is accomplished by placing the solar panel module 600 on top of the rail support 500 so that the lower flange 620 is substantially perpendicular to the guide 510.

As discussed above, once the t-bolt 200 and binding bolt 300 have been assembled within the clamp 100, the next step in securing the solar panel module 600 is accomplished by inserting the enlarged end 210 of the t-bolt 200 into the guide 510. The clamp assembly 100 is then manually moved toward the solar panel module 600. The height of the clamp assembly 100 is adjusted by rotating the flange nut 310 until the bottom surface of the top jaw 120 rests on top of the top flange 610 of the solar panel module 600 and the bottom jaw 110 engages the rear wall 630 of the solar panel module 600. The flange nut 310 is then rotated clockwise. The friction from the nylon patch 235 allows the t-bolt 200 to rotate simultaneously with the binding bolt 300 thereby causing the enlarged end 210 to engage the inner surface of the guide 510. By rotating the flange nut 310, the raised portions 230 then penetrate the inner surface layer of the guide 510. This is shown in more detail in FIG. 11. The top jaw 120 is lowered so that the raised portion 122 penetrates the outer surface layer of the top flange 610, and the serrated raised portions 320 of the flange nut 310 penetrate the outer surface of the top jaw 120 all creating a ground path between the solar panel module 600 and the rail support 500. This is shown in further detail in FIG. 10. The flange nut 310 is then rotated clockwise until solar panel module 600 is sufficiently secured to the rail support 500.

This process is repeated until all the solar panel modules 600 are installed in the array.

What is claimed is:

1. A clamp assembly for securing a solar panel module to a rail support and providing an electrical bonding path between them comprising:
   a. a rear end;
   b. a top jaw further comprising:
      i. a bottom side;
      ii. an aperture; and
      iii. a raised portion;
   c. a bottom jaw coupled to the top jaw at the rear end wherein the top jaw and bottom jaw form an opening such that:
      i. the length of the top jaw is greater than the length of the bottom jaw; and
      ii. wherein the bottom jaw further comprises an aperture that is axially aligned with the aperture of the top jaw;
   d. a t-bolt further comprising:
      i. an elongated bolt; and
      ii. an enlarged end wherein the enlarged end is coupled to an end of the elongated bolt;
   e. a binding bolt further comprising:
      i. an elongated tube;
      ii. a nut coupled to an end of the elongated tube such that the elongated tube is coupled to the elongated bolt.

2. The clamp assembly of claim 1 wherein the rear end, top jaw, and bottom jaw form a generally c-shaped structure.

3. The clamp assembly of claim 1 wherein the elongated bolt of the t-bolt is threaded.

4. The clamp assembly of claim 1 wherein the enlarged end of the t-bolt further comprises at least one raised portion.

5. The clamp assembly of claim 1 wherein the inside of the elongated tube of the binding bolt is threaded.

6. The clamp assembly of claim 1 wherein the nut is serrated on one side of the nut.

7. The clamp assembly of claim 1 wherein the nut further comprises a serrated flange.

8. The clamp assembly of claim 1 wherein the raised portion of the top jaw extends outward from the top jaw.

9. The clamp assembly of claim 1 wherein the enlarged end is perpendicular to the first end of the elongated bolt.

10. The clamp assembly of claim 1 wherein the enlarged end of the t-bolt further comprises a ball detent that is protrudes downward from the bottom of the enlarged end.

11. The clamp assembly of claim 1 further comprising a patch that frictionally engages the elongated nut and the elongated tube when the elongated tube is rotated around the elongated nut.

12. The clamp assembly of claim 11 wherein the patch is fixed to the elongated bolt.

13. The clamp assembly of claim 11 wherein the patch is made of nylon.

14. The clamp assembly of claim 1 wherein the raised portion of the top jaw and the raised portion of the foot are capable of penetrating a surface layer of the solar panel module and rail support respectively.

15. The clamp of claim 1 wherein the clamp assembly is made from an electrically conducting material.

16. A method of securing a solar panel module to a rail support comprising the steps of:
   a. placing a solar panel module on a rail support further comprising a guide on an end of the rail support;
   b. inserting an enlarged end of a t-bolt into the guide wherein the t-bolt further comprises an elongated portion coupled to the enlarged end and the enlarged end further comprises a raised portion;
   c. inserting the elongated portion of the t-bolt through an aperture of a bottom jaw of a clamp and an aperture of a top jaw of the clamp wherein the clamp further comprises a rear end that is coupled to an end of the bottom jaw and an end of the top jaw and wherein the top jaw further comprises a raised portion;
   d. coupling the top jaw to a top portion of the solar panel module;
   e. turning a binding bolt clockwise around the elongated portion until the turning of the binding bolt:
      i. creates a rotational force applied to the enlarged end causing the raised portion of the enlarged end to penetrate a surface layer of the inner portion of the guide; and
      ii. creates a downward force applied to the top jaw that causes the raised portion on the top jaw to penetrate an outer surface layer of the solar panel module, thereby creating an electrical bonding path between the solar panel module and the rail support through the clamp.

17. The method of claim 16 wherein the top jaw, rear end, and bottom jaw comprise a generally c-shaped structure.

18. The method of claim 16 wherein the top jaw further comprises a flange extending from the rear end and has a length that is greater than the length of the lower jaw.

19. The method of claim 16 wherein the elongated bolt of the t-bolt is threaded.

20. The method of claim 16 wherein the clamp assembly is made from an electrically conducting material.

21. The method of claim 16 wherein the binding bolt further comprises a nut on an end of the binding bolt such that the nut further comprises a serrated flange and further comprises the step of turning the nut until the serrations penetrate the top jaw.

\* \* \* \* \*